United States Patent [19]

Itoh et al.

[11] Patent Number: 4,714,733

[45] Date of Patent: Dec. 22, 1987

[54] RUBBER COMPOSITION

[75] Inventors: Kunio Itoh; Takeshi Fukuda; Hiroshi Yoshioka, all of Annaka, Japan

[73] Assignee: Shin-Etsu Chemical Co., Ltd., Tokyo, Japan

[21] Appl. No.: 34,640

[22] Filed: Apr. 6, 1987

[30] Foreign Application Priority Data

Feb. 13, 1987 [JP] Japan ................................. 62-30993

[51] Int. Cl.$^4$ ....................... C08K 3/36; C08L 83/06; C08L 7/00; C08L 83/04
[52] U.S. Cl. ................................. 524/493; 523/213; 524/534; 524/547; 525/102; 525/105
[58] Field of Search ....................... 524/493, 534, 547; 523/212, 213; 525/102, 105

[56] References Cited

U.S. PATENT DOCUMENTS

| | | | |
|---|---|---|---|
| 3,654,215 | 4/1972 | Goossens | 523/212 |
| 3,929,718 | 12/1975 | Kratel et al. | 523/212 |
| 4,201,698 | 5/1980 | Itoh et al. | 524/83 |

FOREIGN PATENT DOCUMENTS

| | | | |
|---|---|---|---|
| 0059951 | 4/1982 | Japan | 524/493 |
| 1004742 | 1/1986 | Japan | 524/493 |
| 8602088 | 4/1986 | World Int. Prop. O. | 524/493 |

*Primary Examiner*—Herbert J. Lilling
*Attorney, Agent, or Firm*—Hopgood, Calimafde, Kalil, Blaustein & Judlowe

[57] ABSTRACT

The rubber composition is formulated with (A) a combination of an ethylene-propylene copolymeric rubber and an organopolysiloxane having at least two alkenyl groups per molecule as the polymeric base, (B) a reinforcing silica filler, (C) an alkoxysilane compound and (D) a thiocarbamyl-containing organosilane compound. The rubber composition can be vulcanized with an organic sulfur compound or organic peroxide as the vulcanizing agent to give a vulcanizate having quite satisfactory mechanical properties including, in particular, greatly improved heat resistance and greatly decreased permanent compression set even without using carbon black as the reinforcing filler. The omission of carbon black in the formulation gives an advantage that the rubber may be colored in any light color.

6 Claims, No Drawings

RUBBER COMPOSITION

BACKGROUND OF THE INVENTION

The present invention relates to a rubber composition or, more particularly, to a rubber composition based on an ethylene-propylene copolymeric rubber curable into an elastomer having excellent properties in respect of heat resistance, permanent compression set and electric insulation as well as receptivity of coloring agents other than carbon black and useful, for example, as a material of parts in automobiles and other machines including rubber rollers, gaskets, packings, rubber hoses, plug boots, terminal caps and the like.

As is well known, rubbery copolymers of ethylene and propylene such as the so-called EPM and EPDM rubbers, referred to as EP rubbers hereinbelow, have excellent mechanical strengths and electric properties so that they are widely used as a material in various machines including automobiles. Disadvantages in these EP rubbers, however, are that the color of the vulcanizates of EP rubbers is always black because the reinforcing filler used in the rubber composition thereof is limited to carbon black and, accordingly, the electric insulation of the vulcanizates cannot be high enough.

A proposal of course has been made to compound an EP rubber-based composition, in place of carbon black, with a light-colored reinforcing filler such as a finely divided silica filler. The silica-filled EP rubber composition has a light color as a matter of course and, in addition, the vulcanizates thereof are imparted with improved electric insulation. A problem in the use of such a silica filler is that the silica particles inherently have silanolic hydroxy groups, i.e. —Si—OH, on the surface and in the pores while the silanolic groups having acidic nature sometimes cause inhibition of vulcanization using an organic peroxide as the vulcanizing agent along with some adverse influences on the heat resistance and permanent compression set or recovery from compression of the vulcanizates.

Another proposal has been made in Japanese Patent Publication No. 57-17011 with an object to solve the above described problems to give a rubber composition by compounding natural rubber or an organic synthetic rubber, e.g. EP rubber, with a siliceous reinforcing filler, an organopolysiloxane having aliphatically unsaturated groups and mercapto groups and an organosilicon compound, e.g. organosilane compound, having, in a molecule, at least one hydroxy or alkoxy group directly bonded to the silicon atom and a polysulfide linkage in the organic group bonded to the silicon atom. Such a formulation of the rubber composition is indeed effective to some extent to improve the mechanical strengths and heat resistance of the vulcanizate while little improvement is obtained in respect of the permanent compression set.

SUMMARY OF THE INVENTION

The present invention accordingly has an object to provide an EP rubber-based composition free from the above described problems and disadvantages. The rubber composition provided by the invention comprises:

(A) 100 parts by weight of a combination composed of (A-1) from 50 to 97% by weight of a rubbery copolymer of ethylene and propylene, and (A-2) from 50 to 3% by weight of an organopolysiloxane represented by the average unit formula $$R^1{}_n SiO_{(4-n)/2}, \qquad (I)$$

in which $R^1$ is a substituted or unsubstituted monovalent hydrocarbon group, the groups denoted by $R^1$ in a molecule having at least two aliphatically unsaturated linkages, and the subscript n is a positive number in the range from 1.90 to 2.05, and having an average degree of polymerization of at least 500;

(B) from 5 to 200 parts by weight of a reinforcing silica filler having a specific surface area of at least 50 $m^2/g$;

(C) from 1 to 20 parts by weight of a first organosilane compound represented by the general formula $$R^2{}_m Si(OX)_{4-m}, \qquad (II)$$

in which $R^2$ is a substituted or unsubstituted monovalent hydrocarbon group selected from the class consisting of alkyl groups having 1 to 6 carbon atoms, cycloalkyl groups having 5 to 8 carbon atoms, phenyl group, vinyl group and 3,3,3-trifluoropropyl group, X is an atom or group selected from the class consisting of hydrogen atom, alkyl groups having 1 to 4 carbon atoms and alkoxy-substituted alkyl groups having 2 to 6 carbon atoms and the subscript m is zero, 1 or 2, or a partial hydrolysis-condensation product thereof having an average degree of polymerization not exceeding 100; and (D) from 0.1 to 10 parts by weight of a second organosilane compound having a thiocarbamyl group in a molecule represented by the general formula $$(R^3O)_a(R^4)_{3-a}Si-R^5-S_b-CS-NR^6{}_2, \qquad (III)$$

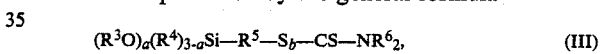

in which $R^3$ is a monovalent group selected from the class consisting of alkyl groups having 1 to 4 carbon atoms, alkoxy-substituted alkyl groups having 2 to 6 carbon atoms, e.g. 2-methoxyethyl and 2-ethoxyethyl groups, cycloalkyl groups having 5 to 8 carbon atoms and phenyl group, $R^4$ is a monovalent hydrocarbon group selected from the class consisting of alkyl groups having 1 to 4 carbon atoms, cycloalkyl groups having 5 to 8 carbon atoms and phenyl group, $R^5$ is a divalent hydrocarbon group of a straightly linear or cyclic structure having 1 to 8 carbon atoms, $R^6$ is a hydrogen atom or a monovalent hydrocarbon group selected from the class consisting of alkyl groups having 1 to 4 carbon atoms and phenyl group, the subscript a is 1, 2 or 3 and the subscript b is a positive integer of from 2 to 6.

DETAILED DESCRIPTION OF THE PREFERRED EMBODIMENTS

As is described in the above given summary of the invention, the essential ingredients in the inventive rubber composition is the components (A) to (D) of which the component (A) is a binary polymeric combination of the components (A-1) and (A-2). Although the components (A-1) and (B) are conventional, the combined formulation of the other ingredients is very unique in the invention and, by virtue thereof, the inventive rubber composition is capable of giving a vulcanizate having excellent properties in respect of heat resistance, permanent compression set and electric insulation without inhibition of vulcanization even when an organic peroxide is used as the vulcanizing agent in addition to the possibility of coloring with a light-colored coloring agent.

The polymeric base ingredient, i.e. component (A), is a binary combination of an EP rubber as the component (A-1) and an organopolysiloxane as the component (A-2). The EP rubber may be a rubbery copolymer of ethylene and propylene and any commercial products can be used for the purpose including those available in the name of an EPM or EPDM rubber. Namely, the EP rubber may be a ternary copolymer of which the third comonomer copolymerized with ethylene and propylene is, for example, ethylidene norbornene, dicyclopentadiene or 1,4-hexadiene.

The organopolysiloxane as the component (A-2) is represented by the average unit formula (I) given above, in which the symbol $R^1$ denotes a monovalent hydrocarbon group exemplified by alkyl groups, e.g. methyl, ethyl, propyl and butyl groups, cycloalkyl groups, e.g. cyclohexyl group, aryl groups, e.g. phenyl and tolyl groups, and alkenyl groups, e.g. vinyl and allyl groups, as well as those substituted groups obtained by replacing a part or all of the hydrogen atoms in the above named hydrocarbon groups with substituent atoms and/or groups such as halogen atoms, cyano groups and the like, e.g. chloromethyl, 3,3,3-trifluoropropyl and 2-cyanoethyl groups. It is essential that at least two of the groups denoted by $R^1$ in a molecule are aliphatically unsaturated groups such as vinyl, allyl, cyclopentadienyl and 3-methacryloxypropyl groups, of which vinyl groups are preferred. In particular, it is preferable that at least 50% by moles or, more preferably, at least 90% by moles of the groups denoted by $R^1$ in the organopolysiloxane are methyl groups. The subscript n is a positive number in the range from 1.90 to 2.05. This limitation means that the organopolysiloxane should have a substantially linear molecular structure although a small number of branching units in a molecule may have no particularly adverse influence. The organopolysiloxane should have an average degree of polymerization of at least 500 corresponding to highly viscous oily or gum-like consistency. When an organopolysiloxane having an average degree of polymerization smaller than 500 is combined with the EP rubber, the resultant vulcanizate of the composition would be somewhat poor in the mechanical strengths.

The organopolysiloxane is combined with the EP rubber with an object to improve the heat resistance, mechanical strengths at elevated temperatures, recoverability from compression and vulcanization characteristics of the EP rubber-based composition. In this regard, the amount of the organopolysiloxane in the component (A) should be in the range from 3 to 50% by weight with the balance, i.e. 97 to 50% by weight, being the EP rubber. When the amount of the organopolysiloxane is too small, the desired effect mentioned above cannot be fully obtained. When the amount of the organopolysiloxane is too large, on the other hand, the vulcanizate of the composition may have somewhat decreased mechanical strengths.

The component (B) in the inventive rubber composition is a finely divided reinforcing silica filler which can be any of known silica fillers conventionally used in silicone rubber compositions. The silica filler should have a specific surface area of at least 50 m$^2$/g as measured by the BET method in order to fully exhibit the desired reinforcing effect. It is preferable that the silica filler should have a specific surface area of at least 100 m$^2$/g or, more preferably, in the range from 100 to 300 m$^2$/g although difficulties in the compounding works may increase as the specific surface area of the silica filler increases. Commercially available silica fillers can be classified into dry-process and wet-process silica fillers depending on the type of the manufacturing process. Various grades of commercial products are available for each of the types and can be used in the invention without particular limitations.

The amount of the reinforcing silica filler in the inventive rubber composition should be in the range from 5 to 200 parts by weight or, preferably, from 20 to 100 parts by weight per 100 parts by weight of the component (A), i.e. the combination of the EP rubber and organopolysiloxane. When the amount of the reinforcing silica filler is too small, no full effect of reinforcement can be obtained so that the vulcanizate of the rubber composition may have poor mechanical properties. When the amount thereof is too large, on the other hand, great difficulties are encountered in the compounding work of the components including roll milling so that practically no uniform rubber composition can be prepared.

The component (C) in the inventive rubber composition is an organosilane compound represented by the general formula (II) or an organopolysiloxane as a partial hydrolysis-condensation product of the organosilane compound. In the general formula (II), $R^2$ is an alkyl group having 1 to 6 carbon atoms, cycloalkyl group having 5 to 8 carbon atoms, phenyl group, vinyl group or 3,3,3trifluoropropyl group, X is a hydrogen atom, alkyl group having 1 to 4 carbon atoms or alkoxy-substituted alkyl group having 2 to 6 carbon atoms and the subscript m is zero, 1 or 2 so that the organosilane should have at least two hydroxy groups or alkoxy groups directly bonded to the silicon atom. When the component (C) is an organopolysiloxane as mentioned above, the molecular structure thereof is not particularly limitative including straightly linear, branched chain-like and cyclic ones provided that the average degree of polymerization thereof does not exceed 100. When the degree of polymerization of the organopolysiloxane is too large, the reactivity thereof with the silanol groups on the surface of the silica particles would be decreased so that the desired effect can be obtained only by the addition of an increased amount thereof to cause an economical disadvantage.

Organosilane compounds in conformity with the general formula (II) and suitable as the component (C) in the inventive rubber composition include: tetraethoxy silane; methyl trimethoxy silane; methyl triethoxy silane; methyl tripropoxy silane; methyl tributoxy silane; vinyl trimethoxy silane; vinyl tri(2-methoxyethoxy) silane; dimethyl diethoxy silane; methyl vinyl dimethoxy silane; methyl vinyl diethoxy silane; methyl phenyl dimethoxy silane; diphenyl silane diol; diphenyl dimethoxy silane; diphenyl diethoxy silane; triphenyl silanol; trimethyl methoxy silane; trimethyl ethoxy silane; dimethyl vinyl silanol; dimethyl vinyl methoxy silane; dimethyl vinyl ethoxy silane; dimethyl phenyl silanol; dimethyl phenyl methoxy silane; dimethyl phenyl ethoxy silane; methyl diphenyl silanol; and 3,3,3-trifluoropropyl trimethoxy silane.

The amount of the component (C) in the inventive rubber composition should be in the range from 1 to 20 parts by weight or, preferably, from 3 to 10 parts by weight per 100 parts by weight of the component (A), i.e. the combination of the EP rubber and organopolysiloxane. When the amount of the component (C) is too small, little improvement can be obtained by the addition thereof in the heat resistance and permanent compression set of the vulcanizate of the composition. When the amount thereof is too large, on the other hand, the activity of the active silanol groups in the silica filler particles would be reduced resulting in decreased mechanical strengths of the vulcanizate of the composition.

The component (D) is a thiocarbamyl-containing organosilane compound represented by the general formula (III) given above. This component serves, when it is used in combination with the component (C), to impart the vulcanizate of the inventive rubber composition with increased mechanical strengths and heat resistance and decreased permanent compression set. In the general formula (III), $R^3$ and $R^4$ are each a monovalent hydrocarbon group selected from the class consisting of alkyl groups having 1 to 4 carbon atoms, i.e. methyl, ethyl, propyl and butyl groups, cycloalkyl groups having 5 to 8 carbon atoms, e.g. cyclohexyl group —$C_6H_{11}$, and phenyl group. In addition, $R^3$ can be an alkoxy-substituted alkyl group having 2 to 6 carbon atoms such as 2-methoxyethyl and 2-ethoxyethyl groups. The group denoted by $R^5$ is a divalent hydrocarbon group having a straightly linear or cyclic structure or, preferably, an alkylene group, having 1 to 8 carbon atoms including ethylene, propylene and butylene groups. The group denoted by $R^6$ is a hydrogen atom or a monovalent hydrocarbon group selected from linear and branched alkyl groups having 1 to 4 carbon atoms and phenyl group. The subscript a in the general formula is 1, 2 or 3 so that the silane compound has at least one hydrocarbyloxy group —$OR^3$ in a molecule. This is particularly important since the organosilane compound has at least one group —$OR^3$ having reactivity with the silanol groups on the silica filler particles while the thiocarbamyl group bonded to the same silicon atom is a partial structure of a sulfur-containing vulcanization accelerator. The subscript b in the general formula (III) is a positive integer in the range from 2 to 6 corresponding to a disulfide linkage to hexasulfide linkage. The value of b is preferably 2, 4 or 6 or, more preferably, 4. Such a thiocarbamyl-containing organosilane compound can be synthesized, for example, according to the procedure disclosed in Japanese Patent Kokai No. 61-4742.

Different from conventional so-called silane coupling agents such as those described, for example, in Japanese Patent Publications Nos. 50-29741, 51-20208 and 57-17011 and used in combination with a silica filler, the thiocarbamyl-containing organosilane compound as the component (D) has, on one hand, at least one alkoxy group reactive with the silanolic hydroxy groups on the surface of the silica particles and, on the other hand, a thiocarbamyl group as a residual structure of sulfur-containing vulcanization accelerators simultaneously in a molecule.

Several examples of the thiocarbamyl-containing organosilane compound suitable as the component (D) include those compounds expressed by the following chemical formulas, in which the symbols Me, Et, Bu and Ph denote methyl, ethyl, butyl and phenyl groups, respectively: $(MeO)_3Si$—$C_3H_6$—$S_4$—$CS$—$NMe_2$; $(EtO)_3Si$—$C_3H_6$—$S_4$—$CS$—$NMe_2$; $(EtO)_3Si$—$C_3H_6$—$S_4$—$CS$—$NEt_2$; $(EtO)_3Si$—$C_3H_6$—$S_4$—$CS$—$NBu_2$; $(EtO)_3Si$—$CH_2CH_2CH_2CHMeCH_2$—$S_4$—$CS$—$NEt_2$; $(EtO)_3Si$—$C_4H_8$—$S_4$—$CS$—$NPh_2$; $(EtO)_3Si$—$C_4H_8$—$S_4$—$CS$—$NPhMe$; $(C_6H_{11}O)_2(Bu)Si$—$C_3H_6$—$S_2$—$CS$—$NEt_2$; $(C_6H_{11}O)(Me)_2Si$—$CH_2$—$S_4$—$CS$—$NBu_2$; $(Ph)_2(EtO)Si$—$C_2H_4$—$S_4$—$CS$—$NMe_2$; $(MeO)_2(Me)Si$—$C_3H_6$—$S_4$—$CS$—$NMe_2$; and $(EtO)_3Si$—$CH_2$—$S_4$—$CS$—$NMe_2$.

The amount of the thiocarbamyl-containing organosilane compound as the component (D) in the inventive rubber composition should be in the range from 0.1 to 10 parts by weight or, preferably, from 0.5 to 5 parts by weight per 100 parts by weight of the component (A), viz. the combination of the EP rubber and organopolysiloxane. When the amount thereof is too small, the desired effect of the component would not be exhibited. When the amount thereof is too large, on the other hand, certain adverse influences are caused in the vulcanization characteristics of the rubber composition and the recoverability of the vulcanizate thereof from compression.

The rubber composition of the invention can be prepared by uniformly blending the above described components (A-1), (A-2), (B), (C) and (D) in a suitable rubber processing machine such as Banbury-type mixers, kneaders, intermixers, two-roller mills and the like. If necessary, the composition under or after blending may be subjected to a heating or aging treatment.

It is of course optional according to need that the rubber composition of the invention is further admixed with various kinds of known additives conventionally formulated in rubber compositions including fillers other than the reinforcing silica filler such as metal oxides, e.g. titanium dioxide, aluminum oxide, zinc oxide and iron oxide, carbon black, graphite powder, calcium carbonate, fine mica flakes, clay, talc, quartz powder, diatomaceous earth, baryta and aluminum hydroxide as well as organic fillers, flame retardants, coloring agents, mold release agents, antioxidants, ultraviolet absorbers, dispersing aids, process oils, higher fatty acids as a lubricant such as stearic and lauric acids, and so on.

The rubber composition of the invention can be shaped and vulcanized in a conventional method into a vulcanizate using a vulcanizing agent admixed therewith which may be a sulfur, an organic sulfur compound or an organic peroxide though not limitative thereto. Organic sulfur compounds suitable as the vulcanizing agent include: zinc dibutyl dithiocarbamate; dibenzothiazyl sulfide; 2-mercaptobenzothiazole; tetramethyl thiuram monosulfide; tetramethyl thiuram disulfide; dipentamethylene thiuram tetrasulfide; and 2-mercaptobenzimidazole. Organic peroxides suitable as the vulcanizing agent include: benzoyl peroxide; 2,4-dichlorobenzoyl peroxide; dicumyl peroxide; 2,5-dimethyl-2,5-bis(tert-butyl peroxy) hexane; di-tertbutyl peroxide; tert-butyl perbenzoate; 1,1-di-tert-butyl-peroxy-3,3,5-trimethyl cyclohexane; 1,3-bis(tert-butyl-peroxy-isopropyl) benzene; and tert-butylperoxyisopropyl carbonate. These vulcanizing agents should be added to the inventive rubber composition in an amount in the range from 0.1 to 10% by weight. The thus obtained vulcanizable rubber composition is shaped by a known method such as compression molding, transfer molding, extrusion molding, injection molding, calendering, impregnation by dipping and the like and cured by heating to give vulcanized rubber articles as desired.

The thus obtained vulcanizate of the inventive rubber composition has excellent properties in the rubbery elasticity, heat and cold resistance, weatherability and, in particular, recoverability from compression so that the composition is particularly useful as a material for the manufacture of various rubber-made automobile parts such as belts, rubber rollers, gaskets, packings, rubber hoses, plug boots, terminal caps and the like.

In the following, the rubber composition of the invention is described in more detail by way of examples, in which the term "parts" always refers to "parts by weight". The Examples are preceded by the description of the synthetic procedure of a thiocarbamyl-containing organosilane compound used in the Examples.

Preparation of thiocarbamyl-containing organosilane

Into a mixture of 202.5 g (1.5 moles) of disulfur dichloride $S_2Cl_2$ and 300 g of dehydrated toluene in a reaction vessel were added dropwise 196 g (1.0 mole) of trimethoxy 3-mercaptopropyl silane of the formula $(MeO)_3SiC_3H_6SH$ and then the reaction mixture was heated at 60° C. for 2 hours with gentle bubbling of nitrogen gas thereinto. Thereafter, the reaction mixture was subjected to distillation under reduced pressure to remove the unreacted reactants and toluene to give 280 g of a silane compound of the formula $(MeO)_3SiC_3H_6S_3Cl$. The yield of this silane compound was 95% of the theoretical value.

Into a mixture composed of 143 g (1.0 mole) of sodium dimethyl dithiocarbamate of the formula $Me_2N-CS-SNa$ and 800 g of dehydrated toluene were added dropwise 280 g (0.95 mole) of the above obtained silane compound and the mixture was heated at 80° C. for 3 hours with gentle bubbling of nitrogen gas thereinto. After cooling to room temperature, the reaction mixture was filtered and distilled under reduced pressure to remove the sodium chloride as a by-product and the unreacted sodium dimethyl dithiocarbamate as well as toluene to give 335 g of the desired thiocarbamyl-containing silane compound of the formula $(MeO)_3SiC_3H_6S_4CSNMe_2$. The yield of this product was 93% of the theoretical value.

EXAMPLES 1 TO 4 AND COMPARATIVE EXAMPLE 1

A base rubber blend was prepared by uniformly blending 95 parts of an ethylene-propylene copolymeric rubber (EPDM Esprene 501A, a product by Sumitomo Chemical Industry Co.) and 5 parts of a dimethylpolysiloxane having an average degree of polymerization of 1000 and terminated at each molecular chain end with a methyl phenyl vinyl silyl group. A rubber composition was prepared by blending this base rubber blend with 40 parts of a precipitated silica filler having a specific surface area of 230 m²/g (Nipsil VN3, a product by Nippon Silica Co.), 8 parts of dimethyl dimethoxy silane (Examples 1 to 3) or 5 parts of an α,ω-dihydroxy dimethylpolysiloxane having a degree of polymerization of 10 (Example 4), 3 parts of a thiocarbamyl-containing silane compound I, II or III each expressed by the chemical formula given below, 5 parts of zinc oxide, 1 part of stearic acid, 2 parts of 2-mercaptobenzimidazole and 15 parts of a process oil (Sunpar 2280, a product by Nippon Sun Oil Co.) in a two-roller mill followed by a heat treatment at 120° C. for 5 minutes and then aging at room temperature of 3 days.

Thiocarbamyl-containing organosilane compounds

I: $(MeO)_3Si-C_3H_6-S_4-CS-NMe_2$
II: $(EtO)_3Si-C_3H_6-S_4-CS-NMe_2$
III: $(EtO)_3Si-C_3H_6-S_4CS-NBu_2$

The thus prepared rubber composition was then uniformly admixed with 1.6% by weight of dicumyl peroxide and compression-molded at 170° C. for 10 minutes under a pressure of 100 kg/cm² to give a vulcanized rubber sheet having a thickness of 2 mm, which was further heated for 2 hours in a hot-air circulating oven at 150° C.

The vulcanized sheets in Examples 1 to 4 were subjected to the measurement of the mechanical properties either as vulcanized or after thermal aging at 200° C. for 72 hours to give the results shown in Table 1.

For comparison (Comparative Example 1), the same experimental procedure as above was repeated excepting omission of the dimethyl dimethoxy silane or α,ω-dihydroxy dimethyl polysiloxane and the thiocarbamyl-containing organosilane compound. The results of this comparative experiment are also shown in Table 1.

TABLE 1

| | Example | | | | Comparative |
|---|---|---|---|---|---|
| | 1 | 2 | 3 | 4 | Example 1 |
| Thiocarbamyl-containing organosilane compound | I | II | III | I | — |
| As vulcanized | | | | | |
| Hardness, JIS | 58 | 58 | 57 | 56 | 60 |
| Ultimate elongation, % | 710 | 690 | 720 | 740 | 750 |
| Tensile strength, kg/cm² | 155 | 149 | 145 | 158 | 158 |
| Tear strength, kg/cm | 34 | 32 | 30 | 35 | 37 |
| Permanent compression set, %, after 22 hours at 150° C. | 33 | 30 | 32 | 29 | 72 |
| Increment after 72 hours at 200° C. | | | | | |
| Hardness, points | +10 | +10 | +11 | +9 | +21 |
| Ultimate elongation, % | −64 | −66 | −69 | −64 | −89 |
| Tensile strength,% | −21 | −19 | −23 | −18 | −86 |

EXAMPLES 5 TO 7 AND COMPARATIVE EXAMPLES 2 AND 3

A base rubber blend was prepared by uniformly blending 70 parts of an ethylene-propylene copolymeric rubber (EPDM Esprene 567, a product by Sumitomo Chemical Industry Co.) and 30 parts of a methylvinylpolysiloxane of the formula

in which m+n=5,000 and m:n=99.5:0.5. A rubber composition was prepared by blending this base rubber blend with 60 parts of a precipitated silica filler (Nipsil VN3, supra), 8 parts of an α,ω-dihydroxy dimethylpolysiloxane having a degree of polymerization of 50, a thiocarbamyl-containing silane compound II used in Example 2 with the amount indicated in Table 2, 5 parts of zinc oxide, 1 part of stearic acid, 2 parts of 2-mercaptobenzimidazole and 15 parts of a process oil (Sunpar 2280, supra) in a two-roller mill followed by a heat treatment at 120° C. for 5 minutes and then aging at room temperature for 3 days.

The thus prepared rubber composition was treated and formed into a vulcanized rubber sheet in the same manner as in Example 1.

The vulcanized sheets in Examples 5 to 7 were subjected to the measurement of the mechanical properties either as vulcanized or after thermal aging at 200° C. for 72 hours to give the results shown in Table 2.

For comparison, the same experimental procedure as above was repeated excepting omission of the α,ω-dihydroxy dimethyl polysiloxane and the thiocarbamyl-containing organosilane compound in Comparative Example 2 and excepting use of 2 parts of a sulfur-containing compound of the formula (EtO)$_3$SiC$_3$H$_6$S$_4$C$_6$Si(OEt)$_3$ in Comparative Example 3 in stead of the thiocarbamyl-containing silane compound II. The results of these comparative experiments are also shown in Table 2.

TABLE 2

|  | Example | | | Comparative Example | |
| --- | --- | --- | --- | --- | --- |
|  | 5 | 6 | 7 | 2 | 3 |
| Thiocarbamyl-containing organosilane compound, parts | 1 | 2 | 3 | — | — |
| As vulcanized | | | | | |
| Hardness, JIS | 68 | 68 | 68 | 68 | 70 |
| Ultimate elongation, % | 595 | 595 | 515 | 590 | 575 |
| Tensile strength, kg/cm$^2$ | 130 | 135 | 138 | 94 | 136 |
| Tear strength, kg/cm | 41 | 40 | 35 | 26 | 39 |
| Permanent compression set, %, after 22 hours at 150° C. | 28 | 32 | 33 | 64 | 51 |
| Increment after 72 hours at 200° C. | | | | | |
| Hardness, points | +9 | +10 | +9 | +16 | +9 |
| Ultimate elongation, % | −50 | −53 | −51 | −75 | −55 |
| Tensile strength, % | −14 | −18 | −23 | −52 | −28 |

What is claimed is:

1. A rubber composition which comprises:
(A) 100 parts by weight of a combination composed of
(A-1) from 50 to 97% by weight of a rubbery copolymer of ethylene and propylene, and
(A-2) from 50 to 3% by weight of an organopolysiloxane represented by the average unit formula R$^1_n$SiO$_{(4-n)/2}$, in which R$^1$ is a substituted or unsubstituted monovalent hydrocarbon group, the groups denoted by R$^1$ in a molecule having at least two aliphatically unsaturated linkages, and the subscript n is a positive number in the range from 1.90 to 2.05, and having an average degree of polymerization of at least 500;
(B) from 5 to 200 parts by weight of a reinforcing silica filler having a specific surface area of at least 50 m$^2$/g;
(C) from 1 to 20 parts by weight of a first organosilane compound represented by the general formula R$^2_m$Si(OX)$_{4-m}$, in which R$^2$ is a substituted or unsubstituted monovalent hydrocarbon group selected from the class consisting of alkyl groups having 1 to 6 carbon atoms, cycloalkyl groups having 5 to 8 carbon atoms, phenyl group, vinyl group and 3,3,3-trifluoropropyl group, X is an atom or group selected from the class consisting of hydrogen atom, alkyl groups having 1 to 4 carbon atoms and alkoxy-substituted alkyl groups having 2 to 6 carbon atoms and the subscript m is zero, 1 or 2, or a partial hydrolysis-condensation product thereof having an average degree of polymerization not exceeding 100; and (D) from 0.1 to 10 parts by weight of a second organosilane compound having a thiocarbamyl group in a molecule represented by the general formula (R$^3$O)$_a$(R$^4$)$_{3-a}$Si—R$^5$—S$_b$—CS—NR$^6_2$, in which R$^3$ is a monovalent group selected from the class consisting of alkyl groups having 1 to 4 carbon atoms, alkoxy-substituted alkyl groups having 2 to 6 carbon atoms, cycloalkyl groups having 5 to 8 carbon atoms and phenyl group, R$^4$ is a monovalent hydrocarbon group selected from the class consisting of alkyl groups having 1 to 4 carbon atoms, cycloalkyl groups having 5 to 8 carbon atoms and phenyl group, R$^5$ is a divalent hydrocarbon group of a straightly linear or cyclic structure having 1 to 8 carbon atoms, R$^6$ is a hydrogen atom or a monovalent hydrocarbon group selected from the class consisting of alkyl groups having 1 to 4 carbon atoms and phenyl group, the subscript a is 1, 2 or 3 and the subscript b is a positive integer of from 2 to 6.

2. The rubber composition as claimed in claim 1 wherein the group denoted by R$^1$ is selected from the class consisting of alkyl groups, cycloalkyl groups, aryl groups and alkenyl groups.

3. The rubber composition as claimed in claim 1 wherein at least 90% in number of the groups denoted by R$^1$ are methyl groups.

4. The rubber composition as claimed in claim 1 wherein the first organosilane compound as the component (C) is selected from the class consisting of tetraethoxy silane; methyl trimethoxy silane; methyl triethoxy silane; methyl tripropoxy silane; methyl tributoxy silane; vinyl trimethoxy silane; vinyl tri(2-methoxyethoxy) silane; dimethyl diethoxy silane; methyl vinyl dimethoxy silane; methyl vinyl diethoxy silane; methyl phenyl dimethoxy silane; diphenyl silane diol; diphenyl dimethoxy silane; diphenyl diethoxy silane; triphenyl silanol; trimethyl methoxy silane; trimethyl ethoxy silane; dimethyl vinyl silanol; dimethyl vinyl methoxy silane; dimethyl vinyl ethoxy silane; dimethyl phenyl silanol; dimethyl phenyl methoxy silane; dimethyl phenyl ethoxy silane; methyl diphenyl silanol; and 3,3,3-trifluoropropyl trimethoxy silane.

5. The rubber composition as claimed in claim 1 wherein the second organosilane compound having a thiocarbamyl group in a molecule is selected from the class consisting of the compounds expressed by the chemical formulas: (MeO)$_3$Si—C$_3$H$_6$S$_4$—CS—NMe$_2$; (EtO)$_3$Si—C$_3$H$_6$—S$_4$—CS—NMe$_2$; (EtO)$_3$Si—C$_3$H$_6$—S$_4$—CS—NEt$_2$; (EtO)$_3$Si—C$_3$H$_6$—S$_4$—CS—NBu$_2$; (EtO)$_3$Si—CH$_2$CH$_2$CH$_2$CHMeCH$_2$—S$_4$—CS—NEt$_2$; (EtO)$_3$Si—C$_4$H$_8$—S$_4$—CS—NPh$_2$; (EtO)$_3$Si—C$_4$H$_8$—S$_4$CS—NPhMe; (C$_6$H$_{11}$O)$_2$(Bu)Si—C$_3$H$_6$—S$_2$—CS—NEt$_2$; (C$_6$H$_{11}$O)(Me)$_2$Si—CH$_2$—S$_4$—CS—NBu$_2$; (Ph)$_2$(EtO)Si—C$_2$H$_4$—S$_4$—CS—NMe$_2$; (MeO)$_2$(Me)Si—C$_3$H$_6$—S$_4$—CS—NMe$_2$; and (EtO)$_3$Si—CH$_2$—S$_4$—CS—NMe$_2$, in which the symbols Me, Et, Bu, Ph and C$_6$H$_{11}$ denote methyl, ethyl, butyl, phenyl and cyclohexyl groups, respectively.

6. The rubber composition as claimed in claim 1 which further comprises sulfur, an organic sulfur compound or an organic peroxide in an amount in the range from 0.1 to 10% by weight based on the overall amount of the components (A), (B), (C) and (D).

* * * * *